United States Patent
Zhang et al.

(10) Patent No.: US 11,488,435 B2
(45) Date of Patent: Nov. 1, 2022

(54) VENDING MACHINE AND METHOD FOR DETECTING HEIGHT OF STORAGE COLUMN

(71) Applicant: Shandong New Beiyang Information Technology Co., Ltd., Shandong (CN)

(72) Inventors: Chunguang Zhang, Shandong (CN); Yang Liu, Shandong (CN); Botao Wang, Shandong (CN); Peng Tao, Shandong (CN); Deyi Li, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 389 days.

(21) Appl. No.: 16/957,864

(22) PCT Filed: Sep. 25, 2018

(86) PCT No.: PCT/CN2018/107374
§ 371 (c)(1),
(2) Date: Jun. 25, 2020

(87) PCT Pub. No.: WO2019/128344
PCT Pub. Date: Jul. 4, 2019

(65) Prior Publication Data
US 2020/0342706 A1    Oct. 29, 2020

(30) Foreign Application Priority Data

Dec. 29, 2017    (CN) .......................... 201711484312.4

(51) Int. Cl.
*G07F 11/16*    (2006.01)
*G01B 21/02*    (2006.01)
(Continued)

(52) U.S. Cl.
CPC .......... *G07F 11/1653* (2020.05); *G01B 21/02* (2013.01); *G06Q 20/18* (2013.01); *B65G 1/06* (2013.01)

(58) Field of Classification Search
CPC ...... G07F 11/1653; G07F 9/026; G07F 11/04; G01B 21/02; G01B 21/08; G06Q 20/18; B65G 1/06
See application file for complete search history.

(56) References Cited

U.S. PATENT DOCUMENTS 4,903,815 A  *  2/1990  Hirschfeld .............. G07F 7/069
                                                    414/280
4,986,441 A  *  1/1991  Kanbe ..................... G07F 11/58
                                                    221/133
(Continued)

FOREIGN PATENT DOCUMENTS

CN    103119633 A    5/2013
CN    204833458 U    12/2015
(Continued)

OTHER PUBLICATIONS

International Search Report dated Dec. 29, 2018, in the International Application No. PCT/CN2018/107374. 4 pages.

*Primary Examiner* — Mussa A Shaawat
(74) *Attorney, Agent, or Firm* — Wilmer Cutler Pickering Hale and Dorr LLP

(57) ABSTRACT

Disclosed are a vending machine and a method of detecting height of a storage column. The vending machine may determine whether a sensor squarely faces the front end surface of the level plate of a storage column by detecting the type of an output signal of the sensor. When the sensor squarely faces the front end surface of the level plate of the storage column, the height of the level plate of the storage column may be obtained based on a height difference between the sensor and the bearing surface of a bucket and (Continued)

the height of the bucket. Thus, according to the height of the level plate of the storage column, the bearing surface of the bucket and the upper edge of the front end surface of the level plate of the storage column lie in the same level when dispensing an item.

18 Claims, 4 Drawing Sheets

(51) Int. Cl.
    *G06Q 20/18*    (2012.01)
    *B65G 1/06*    (2006.01)

(56) References Cited

U.S. PATENT DOCUMENTS

| | | | | |
|---|---|---|---|---|
| 5,385,265 | A | * | 1/1995 | Schlamp .............. G07F 17/0092 700/242 |
| D362,463 | S | * | 9/1995 | Vogelphol ........................ D20/4 |
| 7,419,091 | B1 | * | 9/2008 | Scanlon ................ G07F 19/203 235/379 |
| 10,146,423 | B1 | * | 12/2018 | Reed ..................... G06F 3/0418 |
| 2006/0157560 | A1 | * | 7/2006 | Skor ........................ G07F 9/002 235/381 |
| 2012/0032896 | A1 | * | 2/2012 | Vesely .................... G06F 3/005 345/173 |

FOREIGN PATENT DOCUMENTS

| | | |
|---|---|---|
| CN | 204990506 U | 1/2016 |
| CN | 105719395 A | 6/2016 |
| EP | 2887327 A1 | 6/2015 |
| JP | 2004-362344 A | 12/2004 |
| JP | 2005-196576 A | 7/2005 |
| JP | 2005-209006 A | 8/2005 |

\* cited by examiner

VENDING MACHINE AND METHOD FOR DETECTING HEIGHT OF STORAGE COLUMN

CROSS REFERENCE TO RELATED APPLICATIONS

This application is a national stage application of co-pending International Patent Application No. PCT/CN2018/107374, filed on Sep. 25, 2018, which claims priority to Chinese Patent Application No. 201711484312.4, which was filed with the State Intellectual Property Office of the People's Republic of China on Dec. 29, 2017, the disclosures of both of which are incorporated herein by reference in their entireties.

TECHNICAL FIELD

The present disclosure relates to the field of self-service equipment, for example, to a vending machine and a method of detecting a height of a storage column.

BACKGROUND

In recent years, as sundries, fruits, vegetables, beverages, and other goods are sold on vending machines, the vending machines are becoming increasingly popular.

The emergence of vending machines facilitates people's lives so that people can purchase goods anytime and anywhere in a convenient and quick way. A vending machine in the related art may include a cabinet, multiple storage columns, a bucket, a driving device, and a pickup port. Each storage column may include a level plate, and items in each storage column are supported by the level plate. The pickup port is provided in the cabinet. The driving device drives the bucket to move in the cabinet so that the bucket can be opposite to any one of the storage columns. When the bucket is opposite to storage column, the bucket receives an item discharged from the storage column and carries the item to the pickup port so that the purchaser may take the item away. However, the discharge of an item usually may go abnormal when using the vending machine, thus preventing the purchaser from successfully picking up the item they purchased from the pickup port, affecting the using experience of the purchaser.

SUMMARY

Embodiments of the present disclosure provide a vending machine capable of determining the height of a storage column and thus capable of avoiding the problem in which a bucket cannot receive items normally.

Embodiments of the present disclosure further provide a method of detecting a height of a storage column capable of determining the height of a storage column and thus capable of avoiding the problem in which a bucket cannot receive items normally.

A vending machine includes a cabinet, detection members, a sensor and a controller. The cabinet is provided with a bucket, a driving device and multiple storage columns for storing items. Each storage column includes a level plate and partitioning plates disposed on the level plate. The driving device is configured to drive the bucket to move in the cabinet so that the bucket can be opposite to the front end of any one of the storage columns. A respective detection member is disposed at the front end of each storage column, the lower edge of the detection member is lower than the lower edge of the level plate, and the upper edge of the detection member is not lower than the lower edge of the level plate. The sensor is disposed at the bucket. The controller is communicatively and respectively connected to the sensor and the driving device. The controller is configured to control the driving device to drive the bucket to move so that the lower edge of the detection member is detected by the sensor; control the driving device to drive the bucket to move along a left-and-right direction and detect an output signal of the sensor; when it is detected that the sensor outputs a first signal, control the driving device to drive the bucket to move upward by a preset distance for n times, and after each time of moving upward, control the driving device to drive the bucket to move along the left-and-right direction and detect the output signal of the sensor until the sensor outputs a second signal; and when it is detected that the sensor outputs the second signal, record the height of the bucket in this case as a target height and obtain the height of the storage column according to the target height, where n is an integer.

A method for detecting a height of a storage column is applied in a vending machine. The vending machine includes a cabinet. The cabinet is provided with a bucket, a driving device and multiple storage columns for storing items. Each storage column includes a level plate and partitioning plates disposed on the level plate. The driving device is configured to drive the bucket to move in the cabinet so that the bucket can be opposite to the front end of any one of the storage columns. The front end of each storage column is provided with a detection member, the lower edge of the detection member is lower than the lower edge of the level plate, and the upper edge of the detection member is not lower than the lower edge of the level plate. The bucket is provided with a sensor. When the sensor is lower than the level plate and is located within the thickness range of the detection member and the driving device drives the bucket to move along a left-and-right direction, the sensor outputs a first signal. When the sensor squarely faces the front end surface of the level plate, the driving device drives the bucket to move along the left-and-right direction, the sensor outputs a second signal. The method for detecting a height of a storage column includes the steps described below.

In step S0100, the driving device is controlled to drive the bucket to move so that the lower edge of the detection member is detected by the sensor.

In step S0200, the driving device is controlled to drive the bucket to move along the left-and-right direction and an output signal of the sensor is detected.

In step S0300, when the sensor outputs the first signal, the driving device is controlled to drive the bucket to move upward by a preset distance and the step S0200 is repeated. When it is detected that the sensor outputs the second signal, the height of the bucket in this case is recorded as a target height and the height of the storage column is obtained according to the target height.

Figure 1:
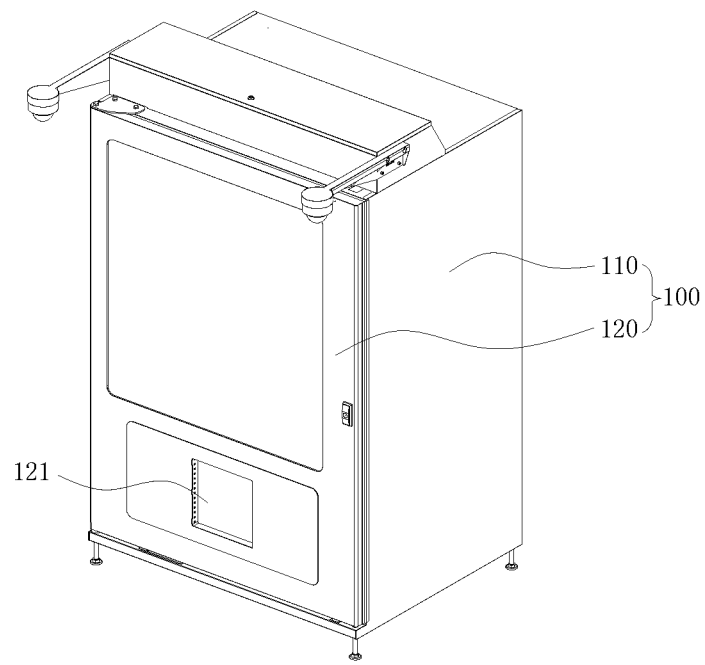
FIG. 1 is a schematic view illustrating the external structure of a vending machine according to one embodiment of the present disclosure.

| Reference Signs | |
|---|---|
| 010. Vending machine | 100. Cabinet |
| 110. Cabinet body | 120. Cabinet door |
| 121. Pickup port | 200. Item storage device |
| 210. Storage column | 211. Level plate |
| 211a. Detection hole | 212. Partitioning plate |
| 300. Bucket | 310. Bearing surface |
| 400. Driving device | 410. First power assembly |
| 420. Second power assembly | 500. Detection member |

DETAILED DESCRIPTION

To make the purpose and the technical solution of embodiments of the present disclosure more clear, the technical solution of embodiments of the present disclosure will be described in conjunction with the drawings. If not in collision, the following embodiments and features thereof may be combined with each other.

Similar reference numerals and letters in the following drawings indicate similar items, and therefore, once a particular item is defined in a drawing, the item is not defined and explained in subsequent drawings.

In the description of embodiments of the present disclosure, the terms "first", "second", "third", etc. are used only for distinguishing between descriptions and are not to be construed as indicating or implying relative importance.

The inventors have found that during the use of a vending machine in the related art, when the weight of items in a storage column is too great, the height of the front end of the level plate is lowered due to pressure, that is, there is a deviation between the actual height of the front end of the level plate and the theoretical height of the front end of the level plate. Moreover, the degree to which the level plate is lowered due to pressure is not certain. Theoretically, the greater the weight of the items is, the greater the degree to which the level plate is lowered due to pressure is. As a result, the height of the storage column is not certain so that the vending machine has the problem of abnormal item discharge.

Figure 2:
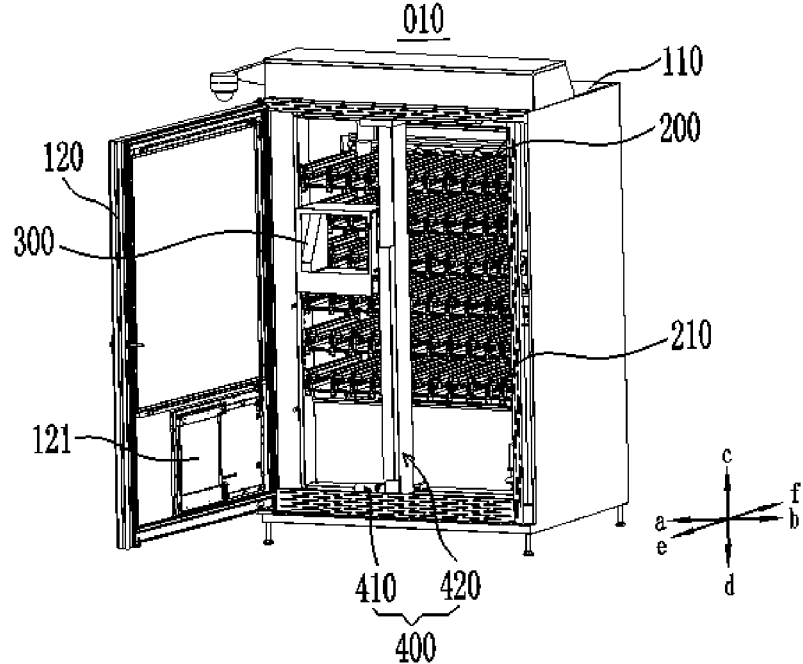
FIG. 2 is a schematic view illustrating the internal structure of a vending machine according to yet another embodiment of the present disclosure.
Figure 3:
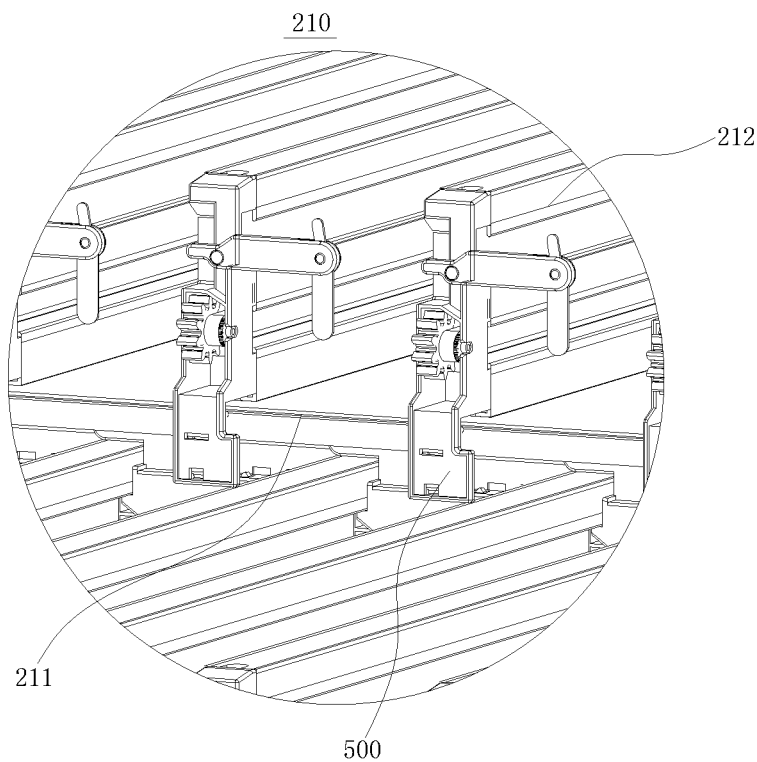
FIG. 3 is a partial enlarged view of a storage column of FIG. 2.

FIG. 1 is a schematic view showing an external structure of a vending machine 010 according to one embodiment of the present disclosure. FIG. 0.2 is a schematic view showing an internal structure of a vending machine 010 according to another embodiment of the present disclosure. FIG. 3 is a partial enlarged view of a storage column of FIG. 2. Referring to FIGS. 1 to 3, in the present embodiment, the vending machine 010 includes a cabinet 100, an item storage device 200, a bucket 300, a driving device 400 and a controller (not illustrated in the drawing).

The cabinet 100 includes a cabinet body 110 and a cabinet door 120. The cabinet door 120 is provided with a pickup port 121. In the present embodiment, the cabinet door 120 is made of a transparent material (such as transparent plastic) to display the items in the cabinet body 110. The item storage device 200 is disposed in the cabinet body 110. The item storage device 200 includes multiple storage columns 210. As illustrated in FIG. 2, the lengthwise direction of each storage column 210 extends along a front-and-back direction (taking FIG. 2 as an example, the front-and-back direction refers to an ef direction). The outlet of each storage column is provided at its front end, i.e., the end of the storage column 210 close to the cabinet door 120. The outlet of each storage column squarely faces the cabinet door 120. In the present disclosure, multiple storage columns 210 are arranged in a Y row along an up-and-down direction (taking FIG. 2 as an example, the up-and-down direction refers to a cd direction) and in an X column along a left-and-right direction (taking FIG. 2 as an example, the left-and-right direction refers to an ab direction).

In conjunction with FIGS. 1 to 4, the bucket 300 is disposed in the cabinet body 110 and is located between the cabinet door 120 and the item storage device 200. The front end (the end close to the cabinet door 120) of the bucket 300 is provided with an outlet and the back end (the end close to the item storage device 200) of the bucket 300 is provided with an inlet. The driving device 400 is disposed in the cabinet body 110 and is located between the cabinet door 120 and the item storage device 200. The driving device 400 is communicatively connected to the controller. The driving device 400 includes a first power assembly 410 and a second power assembly 420. The first power assembly 410 is connected with the bucket 300 in a transmission way and is configured to drive the bucket 300 to move along the left-and-right direction. The second power assembly 420 is connected with the bucket 300 in a transmission way and is configured to drive the bucket 300 to move along the up-and-down direction. In this manner, the driving device 400 can drive the bucket 300 to move along the up-and-down direction and/or the left-and-right direction so that the inlet of the bucket 300 can be made to be opposite to the outlet of any one of the storage columns 210 or the outlet of the bucket 300 can be made to be opposite to the pickup port 121. When the inlet of the bucket 300 is opposite to the outlet of any one of the storage columns 210, the items in the storage column 210 facing the bucket 300 can be delivered to the bucket 300. When the outlet of the bucket 300 is opposite to the pickup port 121, the purchaser can take the item in the bucket 300 away from the pickup port 121.

Please refer to FIG. 3, each storage column 210 includes a level plate 211 and multiple partitioning plates 212 spaced apart on the level plate 211 along the left-and-right direction. An accommodation space for accommodating items is formed by the level plate 211 and adjacent partitioning plates 212. The accommodation space may be referred to as a storage column 210. In the present embodiment, multiple storage columns 210 located in a same row may share a level plate 211.

Figure 4:
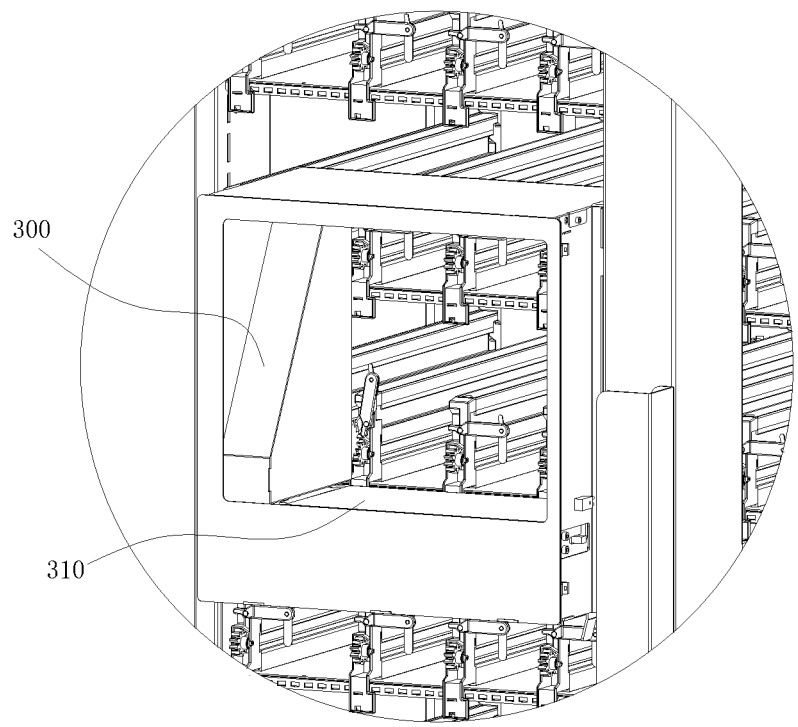
FIG. 4 is a partial enlarged view of the bucket of FIG. 2.

FIG. 4 is a partial enlarged view of a bucket of FIG. 2. Referring to FIG. 4, the bucket 300 is provided with a bearing surface 310 for bearing an item. When the inlet of the bucket 300 is opposite to the outlet of a storage column 210 and receives the items from the storage column 210, the bearing surface 310 and the upper edge of the level plate 211 need to be located in a same level so that the item in the storage column 210 can smoothly enter the bucket 300. When the weight of the items in the storage column 210 is too great, the height of the front end of the level plate 211 is lowered due to pressure and the degree to which the level plate 211 is lowered due to pressure is affected by the weight of the items so that the actual height of the storage column 210 and the theoretical height of the storage column 210 are different. Because the actual height of the level plate 211 of the storage column 210 and the theoretical height of the level plate 211 of the storage column 210 are different and the actual height of the level plate 211 of the storage column 210 affected by the weight of the items in the storage column 210 is not certain, if the bearing surface 310 of the bucket 300 is set according to the theoretical height of the storage column 210, the bearing surface 310 for bearing an item in the bucket 300 and the upper edge of the front end of the level plate 211 are not located in a same plane when the bucket 300 receives the item so that the item in the storage column 210 entering the bucket 300 is hindered and the discharge of an item would become abnormal. Referring to FIG. 3, to improve the problem, in the present embodiment, the vending machine 010 further includes detection members 500. A detection member 500 is a strip-shaped plate extending along a vertical direction (referring to FIG. 2, the vertical direction refers to a cd direction), that is, the detection member 500 has a certain thickness. The detection member 500 is disposed at the front end of a storage column 210, the lower edge of the detection member 500 is lower than the lower edge of the level plate 211 located in the same storage column 210, and the upper edge of the detection member 500 is not lower than the lower edge of the level plate 211. Exemplarily, in the present embodiment, the detection member 500 is connected to the front end of the respective partitioning plate 212 (i.e., the end of the partitioning plate 212 close to the cabinet door 120), and the upper edge of the detection member 500 is higher than the upper edge of the level plate 211.

Figure 6:
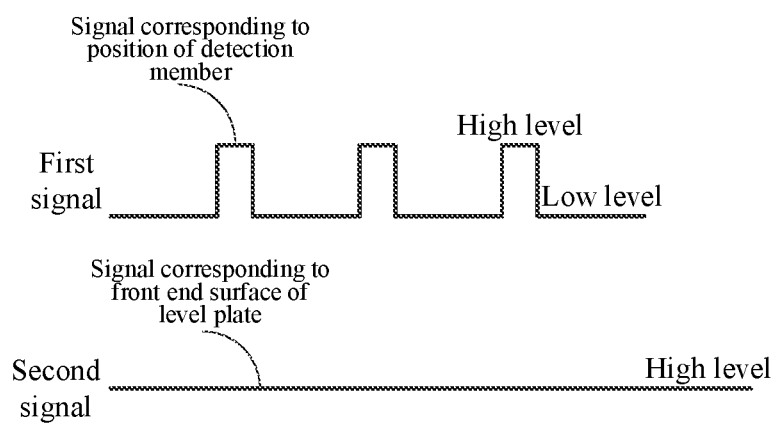
FIG. 6 is a schematic diagram of a first signal and a second signal detected by a sensor when the front end surface of a level plate is a plane according to one embodiment of the present disclosure.

In one or more embodiments, in conjunction with FIG. 3 and FIG. 6, FIG. 3 is a partial enlarged view of a storage column of FIG. 2 and FIG. 6 is a schematic diagram of a first signal and a second signal output by a sensor when a front end surface of a level plate is a plane. The vending machine 010 further includes a sensor (not shown in the drawing). The sensor is disposed at the bucket 300 and moves along with the bucket 300. The sensor is communicatively connected to the controller. When the sensor is lower than the lower edge of the level plate 211 and is located within the thickness range of the detection member 500 (the thickness of the detection member 500 may refer to the distance between the upper edge of the detection member 500 and the lower edge of the detection member 500), if the driving device 400 drives the bucket 300 to move along the left-and-right direction, in the process of the bucket 300 moving along the left-and-right direction, the sensor reaches the position corresponding to each detection member 500 in turn. When the sensor reaches the position of a detection member 500, the sensor cooperates with the detection member 500 and outputs a first level such as a high level. The sensor leaves the position of the detection member 500. When the sensor leaves the detection member 500 and before the sensor reaches the position of the next detection member 500, the sensor outputs a second level such as a low level. By such analogy, in the process of the sensor moving along the left-and-right direction, the signal output by the sensor is referred to as a first signal and the first signal is a pulse signal. When the sensor squarely faces the front end surface of the certain level plate 211, i.e., the side of this level plate 211 close to the cabinet door 120, if the driving device 400 drives the bucket 300 to move along the left-and-right direction, the sensor is always located within the thickness range of the level plate 211. When the sensor moves along with the bucket 300 and is always located within the thickness range of the level plate 211, the signal output by the sensor is referred to as a second signal. The sensor squarely facing the front end surface of the certain level plate 211 may refer to that the sensor is located within the thickness range of the level plate 211, where the thickness of the level plate may refer to the distance between the upper edge of the level plate and the lower edge of the level plate. In the present embodiment, the front end surface of the level plate 211 is a plane. In this case, the second signal has a continuous and constant value, such as a high level. In this manner, the controller can determine whether the sensor squarely faces the front end surface of a certain level plate 211 by detecting whether the signal output by the sensor is the first signal or the second signal. When the sensor squarely faces the front end surface of a certain level plate 211, the controller can obtain the height of the level plate 211 of the storage column 210 directly facing the sensor according to a height difference between the sensor and the bearing surface 310 of the bucket 300 and the height of the bucket 300. According to the height of the level plate 211 of the storage column 210, the bearing surface 310 of the bucket 300 and the upper edge of the front end of the level plate 211 of the storage column 210 can be made to be located in a same plane when the items are delivered. In this manner, the abnormal discharge of the items caused by the uncertainty of the height of the storage column 210 can be improved.

In an optional example, the process of obtaining the height of a storage column 210 is described. The controller controls the driving device 400 to drive the bucket 300 to move so that the sensor detects the lower edge of the detection member 500. The controller controls the driving device 400 to drive the bucket 300 to move along the left-and-right direction and detects an output signal of the sensor. When the controller detects that the sensor outputs a first signal, the controller controls the driving device 400 to drive the bucket 300 to move upward by a preset distance for n times. When the bucket 300 moves upward by a preset distance each time, the controller controls the driving device 400 to drive the bucket 300 to move along the left-and-right direction and detects the output signal of the sensor until the sensor outputs a second signal. When the controller detects that the sensor outputs the second signal, the height of the bucket 300 at this point is recorded as a target height and the height of the storage column 210 is obtained according to the target height, where n is an integer.

Figure 5:
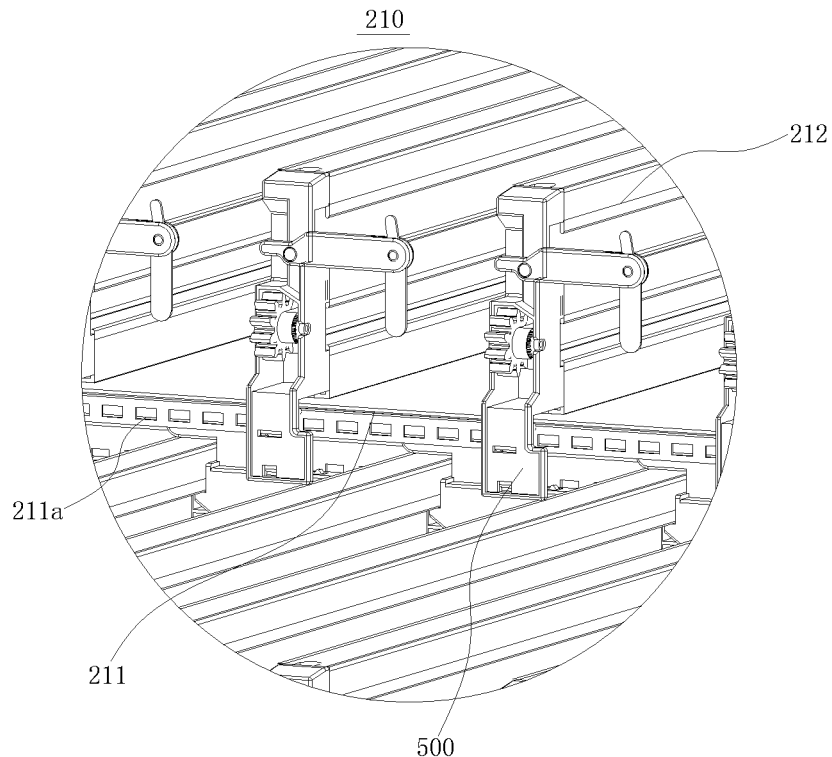
FIG. 5 is a schematic view of the front end surface of a level plate of a vending machine according to yet another embodiment of the present disclosure.
Figure 7:
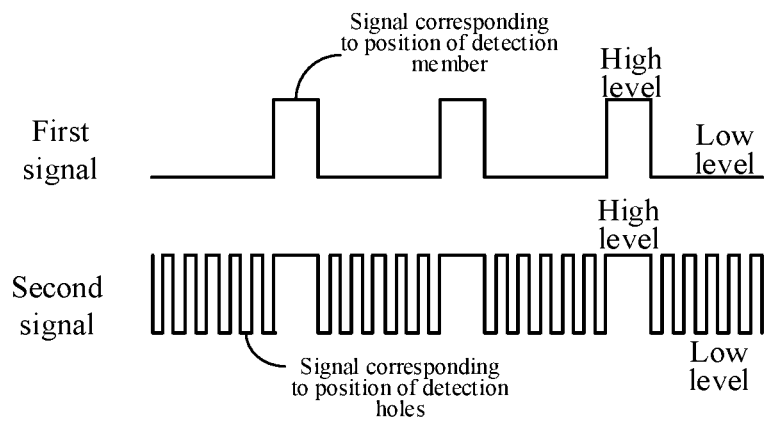
FIG. 7 is a schematic diagram of a first signal and a second signal detected by a sensor when the front end surface of a level plate is provided with detection holes according to one embodiment of the present disclosure.

In other embodiments, the second signal may also be a pulse signal. Referring to FIG. 5 and FIG. 7, FIG. 5 is a structure view of a front end surface of a level plate 211 and FIG. 7 is a schematic diagram of a first signal and a second signal detected by a sensor when a front end surface of a level plate is provided with detection holes. Along the left-and-right direction, multiple detection holes 211a are spaced apart in the front end surface of the level plate 211. Along the left-and-right direction, the distance between adjacent detection holes 211a is less than the distance between adjacent detection members 500. In this manner, when the sensor squarely faces the front end surface of the level plate 211, if the driving device 400 drives the bucket 300 to move along the left-and-right direction, the sensor reaches the position of each detection hole 211a in turn. When the sensor reaches the position of a detection hole 211a, the sensor outputs a second level such as a low level. When the sensor leaves the detection hole 211a and before the sensor reaches the position of the next detection hole 211a, the sensor outputs a first level such as a high level. By such analogy, in the process of the sensor moving along the left-and-right direction, the second signal output by the sensor is a pulse signal. As shown in FIG. 7, because the distance between adjacent detection holes 211a is less than the distance between adjacent detection members 500, the second signal is different from the first signal. In this manner, a first reference signal corresponding to the first signal and a second reference signal corresponding to the second signal may be stored in advance. By the comparison between the signal output by the sensor and the first reference signal and the comparison between the signal output by the sensor and the second reference signal, it can be determined that whether the signal output by the sensor is the first signal or the second signal and whether the sensor squarely faces the front end surface of the level plate 211.

In an optional embodiment, the height of the sensor is configured to be the same as the height of the bearing surface 310 for bearing the items in the bucket 300. In this manner, when the bearing surface 310 of the bucket 300 and the upper edge of the level plate 211 are located in a same plane, the sensor squarely faces the front end surface of the level plate 211. In this manner, if the height of the upper edge of the level plate 211 is taken as the height of the storage column 210 and the height of the bearing surface of the bucket 300 is taken as the height of the bucket 300, the sensor can be moved to the proximity to the lower edge of the detection member 500 by the manner in which the bucket 300 is moved below the theoretical height of the storage column 210. Therefore, the efficiency of the sensor positioning the lower edge of the detection member 500 of the level plate 211 is improved.

The vending machine provided by the present embodiment can make the bearing surface of the bucket and the upper edge of the front end of the level plate located in a same plane so that the abnormal delivering of the items caused by the uncertain height of the storage column can be improved.

Figure 8:
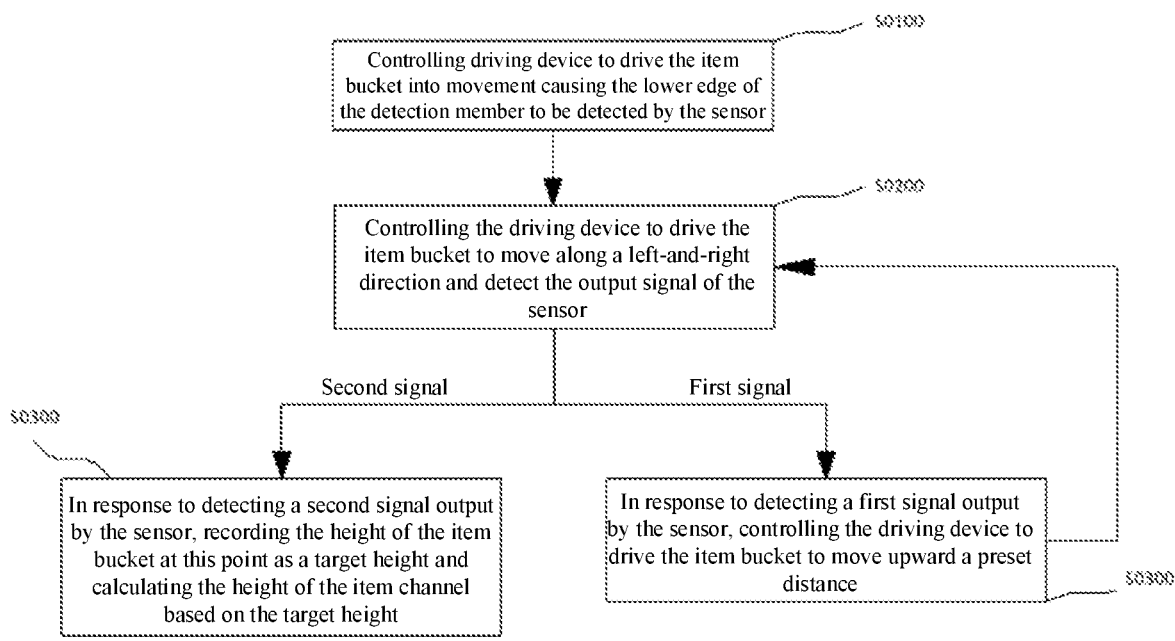
FIG. 8 is a flowchart of a method of detecting a height of a storage column according to yet another embodiment of the present disclosure.

The present embodiment further provides a method for detecting a height of a storage column. The method is performed based on the preceding vending machine 010. FIG. 8 is a flowchart of a method for detecting a height of a storage column according to the present embodiment. Referring to FIG. 8, the method for detecting a height of a storage column may include steps S0100 to S0300.

In step S0100, the driving device 400 is controlled to drive the bucket 300 to move so that the sensor located at the bucket 300 detects the lower edge of the detection member 500.

In one or more embodiments, the controller controls a first power assembly 410 to drive the bucket 300 to move along the left-and-right direction so that the sensor at the bucket 300 and a detection member 500 are located in a same position along the left-and-right direction. The controller controls a second power assembly 420 to drive the bucket 300 to be located below the detection member 500 along a vertical direction. The controller controls the second power assembly 420 to drive the bucket 300 to move upward. In the process of the bucket 300 moving upward, the lower edge of the detection member is detected by the sensor 500.

In one or more embodiments, when the sensor at the bucket 300 detects the lower edge of the detection member 500, the height of the bucket 300 in this case is recorded as an initial height.

In step S0200, the driving device 400 is controlled to drive the bucket 300 to move along the left-and-right direction and an output signal of the sensor is detected.

In one or more embodiments, when the lower edge of the detection member is detected by the sensor 500, the controller controls the first power assembly 410 to drive the bucket 300 to move along the left-and-right direction. In the process of the bucket 300 moving along the left-and-right direction, the controller detects the output signal of the sensor.

In step S0300, when it is detected that the sensor outputs a first signal, the driving device 400 is controlled to drive the bucket 300 to move upward by a preset distance and the operation in step S0200 is repeated. When it is detected that the sensor outputs a second signal, the height of the bucket 300 at this point is recorded as a target height and the height of the storage column 210 is obtained according to the target height.

In one or more embodiments, when the controller detects that the sensor outputs the first signal, it is determined that the sensor is lower than the thickness range of the level plate 211 and is located within the thickness range of the detection member 500. In this case, the controller controls the second power assembly 420 to drive the bucket 300 to move upward by the preset distance and the operation in step S0200 is repeated.

In one or more embodiments, when the controller detects that the sensor outputs the second signal, it is determined that the sensor squarely faces the front end surface of the level plate 211. The controller records the height of the bucket 300 in this case as a target height and obtains the height of the storage column according to the target height.

The preceding steps may be performed so that each storage column 210 is detected and the corresponding target height is obtained for each storage column 210. When the bucket 300 is controlled to receive the goods in a certain storage column 210, the bucket 300 is directly driven to move to the target height corresponding to the storage column 210. In this case, the controller can obtain the height of the level plate of the storage column according to a height difference between the sensor and the bearing surface 310 of the bucket 300 and the height of the bucket. According to the height of the level plate of the storage column, the bearing surface 310 of the bucket 300 and the front end of the level plate 211 of the storage column 210 can be made to be located in a same plane when the items are delivered so that the abnormal discharge of the items caused by the uncertainty of the height of the storage column can be improved.

When the height of the sensor is equal to the height of the bearing surface 310 for bearing the items in the bucket 300, the bucket 300 is driven to the target height corresponding to the storage column 210 so that the bearing surface 310 of the bucket 300 and the front end of the level plate 211 of the storage column 210 can be made to be located in a same plane.

In one or more embodiments, the method for detecting a height of a storage column further includes: obtaining a height compensation value, where the height compensation value is a difference between a target height and an initial height.

When the bearing surface 310 of the bucket 300 needs to be positioned at the upper edge of the level plate 211 of a certain storage column 210 for the first time, the driving device 400 is controlled by the controller to drive the bucket 300 to move so that the initial height of the bucket and the target height of the bucket are obtained and a height compensation value can be obtained and stored according to the target height of the bucket and the initial height of the bucket. The bucket 300 is moved according to the height compensation value so that the bearing surface 310 of the bucket 300 is positioned at the upper edge of the level plate 211 of the storage column 210 and the items on the level plate 211 can smoothly enter the bucket.

When the items needs to be delivered from the storage column 210 for the second time, the items in the storage column 210 can smoothly enter the bucket according to the saved height compensation value and the initial height corresponding to the storage column 210. When the controller controls the driving device 400 to drive the bucket 300 to move to the front end surface of the level plate 211 of a certain storage column 210, the driving device 400 drives the bucket 300 to move so that the sensor located at the bucket 300 detects the lower edge of the detection member 500 of the storage column and the height of the bucket 300 in this case is recorded as an initial height; the driving device 400 drives the bucket 300 to move upward by a distance of a height compensation value so that the sensor located at the bucket 300 can be made to be located within the thickness range of the level plate 21 of the storage column 210. According to the position of the sensor at the bucket 300, the driving device 400 drives the bearing surface 310 of the bucket 300 to be positioned at the upper edge of the level plate 211 of the storage column 210 so that the items on the level plate 211 can smoothly enter the bucket. It should be understood by those skilled in the art, when the items needs to be delivered from the storage column 210 for the second time, the driving device 400 is controlled by the controller to drive the bucket 300 to move so that the initial height of the bucket and the target height of the bucket are obtained, the bearing surface 310 of the bucket 300 is positioned at the upper edge of the level plate 211 of the storage column 210, and the items in the storage column 211 can smoothly enter the bucket.

Thus, by using the method for detecting height of a storage column that is provided by the embodiments according to the present disclosure, the bearing surface of the bucket and the front end of the level plate can be made to lie in a same plane. Thus, the abnormal discharge of the items caused by the uncertainty of the height of the storage column may be improved.

What is claimed is:

1. A vending machine, comprising:
    a cabinet, comprising a bucket, a driving device, and a plurality of storage columns for storing items that are disposed in the cabinet, each of the plurality of storage columns comprising a level plate and partitioning plates disposed on the level plate, the driving device being configured to drive the bucket to move in the cabinet causing the bucket to be opposite to a front end of one of the plurality of storage columns;
    a detection member arranged at the front end of each of the plurality of storage columns, wherein a lower edge of the detection member is lower than a lower edge of the level plate, and an upper edge of the detection member is not lower than the lower edge of the level plate;
    a sensor, disposed at the bucket; and
    a controller, communicatively connected to the sensor and to the driving device;
    wherein the controller is configured to:
    control the driving device to drive the bucket into movement causing the lower edge of the detection member to be detected by the sensor;
    control the driving device to drive the bucket to move along a left-and-right direction and detect an output signal of the sensor;
    in response to detecting a first signal output by the sensor, control the driving device to drive the bucket to move upward a preset distance incrementally for a number of n times, wherein after each time of moving upward, control the driving device to drive the bucket to move along the left-and-right direction and detect the output signal of the sensor until the sensor outputs a second signal; and
    in response to detecting the second signal output by the sensor, record a height of the bucket at this point as a target height and obtain a height of the corresponding storage column according to the target height, where n is a positive integer.

2. The vending machine of claim 1, wherein the detection member is disposed at an end of the corresponding partitioning plate adjacent to the bucket.

3. The vending machine of claim 1, wherein the plurality of storage columns are arranged in a plurality of rows along an up-and-down direction and in a plurality of columns along the left-and-right direction, and wherein the storage columns in a same row share a same level plate.

4. The vending machine of claim 1, wherein the sensor has the same height as a bearing surface for bearing an item in the bucket.

5. The vending machine of any one of claims 1, wherein the first signal is a pulse signal, and wherein the second signal has a continuous and constant value.

6. The vending machine of claim 1, wherein a plurality of detection holes are provided in a front end surface of the level plate and are spaced apart from each other along the left-and-right direction, wherein along the left-and-right direction a distance between adjacent detection holes is less than that between adjacent detection members, and wherein the first signal and the second signal are both pulse signals.

7. The vending machine of claim 2, wherein the first signal is a pulse signal, and wherein the second signal has a continuous and constant value.

8. The vending machine of claim 3, wherein the first signal is a pulse signal, and wherein the second signal has a continuous and constant value.

9. The vending machine of claim 4, wherein the first signal is a pulse signal, and wherein the second signal has a continuous and constant value.

10. The vending machine of claim 2, wherein a plurality of detection holes are provided in a front end surface of the level plate and are spaced apart from each other along the left-and-right direction, wherein along the left-and-right direction a distance between adjacent detection holes is less than that between adjacent detection members, and wherein the first signal and the second signal are both pulse signals.

11. The vending machine of claim 3, wherein a plurality of detection holes are provided in a front end surface of the level plate and are spaced apart from each other along the left-and-right direction, wherein along the left-and-right direction a distance between adjacent detection holes is less than that between adjacent detection members, and wherein the first signal and the second signal are both pulse signals.

12. The vending machine of claim 4, wherein a plurality of detection holes are defined in a front end surface of the level plate and are spaced apart from each other along the left-and-right direction, wherein along the left-and-right direction a distance between adjacent detection holes is less than that between adjacent detection members, and wherein the first signal and the second signal are both pulse signals.

13. A method of detecting a height of a storage column, applied to a vending machine comprising a cabinet, the cabinet comprising a bucket, a driving device, and a plurality of storage columns configured for storing items that are disposed in the cabinet, wherein each of the plurality of storage columns comprises a level plate and partitioning plates disposed on the level plate, wherein; the driving device is configured to drive the bucket to move in the cabinet causing the bucket to be opposite to a front end of one of the plurality of storage columns, wherein a detection member is arranged at the front end of each of the plurality of storage columns, wherein a lower edge of the detection member is lower than a lower edge of the level plate, and an upper edge of the detection member is not lower than the lower edge of the level plate, wherein the bucket is provided with a sensor, wherein when the sensor is lower than the level plate and lies within a thickness range of the detection member and the driving device drives the bucket to move along a left-and-right direction, the sensor outputs a first signal, wherein when the sensor squarely faces a front end surface of the level plate and the driving device drives the bucket to move along the left-and-right direction, the sensor outputs a second signal, the method comprising:

controlling the driving device to drive the bucket into movement causing the lower edge of the detection member to be detected by the sensor;

controlling the driving device to drive the bucket to move along the left-and-right direction and detecting an output signal of the sensor; and in response to detecting the first signal output by the sensor, controlling the driving device to drive the bucket to move upward a preset distance incrementally and repeating the above operation of controlling the driving device to drive the bucket to move along the left-and-right direction and detecting an output signal of the sensor; and in response to detecting the second signal output by the sensor, recording a height of the bucket at this point as a target height and obtaining a height of the corresponding storage column according to the target height.

14. The method of claim 13, wherein in the operation of controlling the driving device to drive the bucket into movement causing the lower edge of the detection member to be detected by the sensor, in response to the sensor detecting the lower edge of the detection member, the height of the bucket at this point is recorded as an initial height; and the method further comprises:

obtaining a height compensation value, the height compensation value being a difference between the target height and the initial height.

15. The method of claim 13, wherein the first signal is a pulse signal, and wherein the second signal has a continuous and constant value.

16. The method of claim 13, wherein the first signal and the second signal are both pulse signals.

17. The method of claim 14, wherein the first signal is a pulse signal, and wherein the second signal has a continuous and constant value.

18. The method of claim 14, wherein the first signal and the second signal are both pulse signals.

\* \* \* \* \*